United States Patent [19]

Panyard

[11] Patent Number: 5,588,794
[45] Date of Patent: Dec. 31, 1996

[54] ROBOTIC GRIPPER

[75] Inventor: James R. Panyard, Westland, Mich.

[73] Assignee: Ford Motor Company, Dearborn, Mich.

[21] Appl. No.: 276,574

[22] Filed: Jul. 18, 1994

[51] Int. Cl.$^6$ ..................................................... B66C 1/10
[52] U.S. Cl. .............................. 414/729; 901/37; 901/39; 294/115; 294/88
[58] Field of Search ........................... 414/729; 294/86.4, 294/115, 88; 901/39, 37

[56] References Cited

U.S. PATENT DOCUMENTS

| | | | |
|---|---|---|---|
| 3,020,078 | 2/1962 | Ray | 294/63 |
| 3,241,687 | 3/1966 | Orloff | 214/1 |
| 3,938,846 | 2/1976 | Yuryan | 294/115 X |
| 3,998,338 | 12/1976 | Suzuki et al. | 214/1 BC |
| 4,368,913 | 1/1983 | Brockmann et al. | 294/106 |
| 4,674,946 | 6/1987 | Crawford | 414/729 |
| 4,799,853 | 1/1989 | Wrobbel et al. | 414/730 |
| 4,887,341 | 12/1989 | Sakimori et al. | 29/156.4 R |
| 4,915,569 | 4/1990 | Cherko | 414/401 |
| 4,952,117 | 8/1990 | Nerger | 901/45 X |
| 4,960,298 | 10/1990 | Moroi | 901/45 X |
| 5,320,395 | 6/1994 | Gernhardt et al. | 294/86.4 |

*Primary Examiner*—Donald W. Underwood
*Attorney, Agent, or Firm*—Joseph W. Malleck; Roger L. May

[57] ABSTRACT

A gripper is provided for mounting to a distal end of a robotic arm for gripping a workpiece having a pair of spaced apart longitudinally extending contoured faces and at least two extending cylindrical bores, each cylindrical bore having an inner surface, the gripper including a base, a pair of spaced apart longitudinally extending stabilizing members each affixed to the base, each of the stabilizing members having an engagement surface adapted to abutting engage a respective contoured face of the workpiece, at least one pair of opposing clamping arms, each clamping arms being pivotal from a first position wherein the clamping arm is disposed adjacent a respective cylindrical bore to a second position wherein the clamping arm abuttingly engages the inner surface of a cylindrical bores, a pair of biasing cylinders means connected to one of said pair of clamping arms for moving said one clamping arm from said first position to said second position, a pair of spaced apart compliant devices affixed to the base for releasably connecting the base to the distal end of the robotic arm and a control system for selectively controlling the actuation of the biasing cylinders.

19 Claims, 4 Drawing Sheets

ROBOTIC GRIPPER

CROSS REFERENCE TO RELATED APPLICATION

This application is related to U.S. patent application Serial No. 08/276,575, filed on the same day as this application, entitled "System For Locating An End Effector Of A Robot Relative To A Part", which is assigned to the assignee of the present application and which is incorporated in its entirety by reference hereby.

TECHNICAL FIELD

This invention relates to a robotic gripper for gripping a workpiece having a particular engagement surface. More specifically, this invention relates to a robotic gripper for handling "V" configured engine blocks during the manufacturing and assembly process.

BACKGROUND ART

It is generally known in the automotive industry to transport rough cast engine blocks in a stacked relationship comprised of multiple layers of engine blocks divided by horizontally disposed dunnage trays. More specifically, rough cast internal combustion engine blocks are often stacked on plastic dunnage trays adapted to support four engine blocks in, for example, a 2×2 arrangement. In this manner, four engine blocks are positioned atop a bottom dunnage tray. An intermediate dunnage tray is then placed atop the bottom four layered engine blocks, and an additional layer of four engine blocks is then placed atop the intermediate dunnage. In this fashion, layers of engine blocks and dunnage trays can be placed one atop the other in a multiple layered fashion such that stacks of up to three or four layers of engines can be achieved. It is known that the amount of engines and dunnage trays stacked depends upon the structural capabilities of the dunnage trays and the individual weight of each internal combustion engine block.

In this manner, it is known to transport these rough cast engine blocks from the initial manufacturing casting location to a machining location. The rough cast engine blocks are often subjected to numerous machining operations, ranging from rough machining or grinding to intermediate machining, and finally to finishing or microfinishing. The stacks of engine blocks are received at the machining location and must be unloaded from the stacked position and loaded one by one onto the various machining operations loading stations.

Currently, a human operator must manually remove the top dunnage tray which is used for protection of the top layer of engine blocks. The dunnage tray is often removed and placed in a position where the rest of the intermediate, and lower dunnage trays can be stacked for reuse or recycling. After the top dunnage tray is removed, the operator manually affixes a tong-like device or other like device which is capable of adequately gripping the engine block. The operator then initiates a manual operation where the engine block is lifted off the dunnage tray. The operator then must manually manipulate the raised engine block which weighs anywhere from 100 to 300 pounds to the loading station of the machining operation and disengage the tong-like gripper from the block.

In this manner, the operator repeats the procedure for each particular engine block of each layer and then must remove the intermediate dunnage trays until the entire stack has been loaded onto the machining operation line. Additionally, the operator stacks the dunnage trays in some sort of organized fashion.

After the block is cast, and after the initial machining, the block is shipped to a manufacturing location. To facilitate this, the blocks are stacked on their respective dunnage for shipping. When the blocks are received at the machining location, they must again be unloaded.

It is thus desirable to provide an automated apparatus or method for loading and unloading both stacked engine blocks and the required dunnage needed for the stacked fashion. This automated system is desirable for providing loading and unloading of the engine blocks quickly and efficiently. It is known that manual loading and unloading is time-consuming, and each individual operator must affix tong-like mechanisms to each engine block which is often difficult and time-consuming. Further, movement of the engine block in a lateral fashion after the tong mechanisms have been affixed must be effectuated in a reasonably calculated and determined fashion due to the weight of each individual engine block and the difficulty in placing the engine block in the exact spot at each individual loading station.

U.S. Pat. No. 4,887,341 to Sakimori et al. discloses a robot for properly registering a cylinder head to an engine block. The cylinder head is set on the engine block while inserting protruding coupling bolts into bolt engaging bores in the engine block, thereby temporarily holding the cylinder head on the engine block.

U.S. Pat. No. 4,368,913 to Brockman et al. discloses a robot gripping device for gripping workpieces having opposite contoured faces. The gripping jaws include double parallel linkages including a coupler link at one end of the linkage which carries the clamping jaw and a flap interconnecting two parallel crank arms.

SUMMARY OF THE INVENTION

A gripper is provided for mounting to a distal end of a robotic arm for gripping a workpiece, such as dunnage, or an engine block having a pair of spaced apart longitudinally extending contoured faces and at least two extending cylindrical bores, each cylindrical bore having an inner surface. The gripper includes a base, a pair of spaced apart longitudinally extending stabilizing members each affixed to the base, each of the stabilizing members having an engagement surface adapted to abuttingly engage a respective contoured face of the engine block. The gripper further includes at least one pair of opposing clamping arms, each clamping arm being pivotal from a first position where the clamping arm is disposed adjacent a respective cylindrical bore to a second position wherein the clamping arm abuttingly engages the inner surface of a cylindrical bore.

The gripper of the present invention is further provided with a pair of biasing cylinders for moving the clamping arms from the first position to the second position, a pair of compliant devices for releasably affixing the gripper to the distal end of the robotic arm and a control system for selectively controlling the actuation of the biasing cylinders.

It is an object of the present invention to provide a gripper adapted to load, carry, and unload a one or more engine blocks from a stacked array of engine blocks or associated dunnage.

It is a further object of the present invention to provide a gripper which is capable of gripping a V-configured engine block easily and quickly, without damage to the cylinder walls of the engine block.

These and other features and additional objects of the invention will occur to those skilled in the art on reading the following description with reference to the accompanying drawings.

BEST MODE FOR CARRYING OUT THE INVENTION

Figure 1:
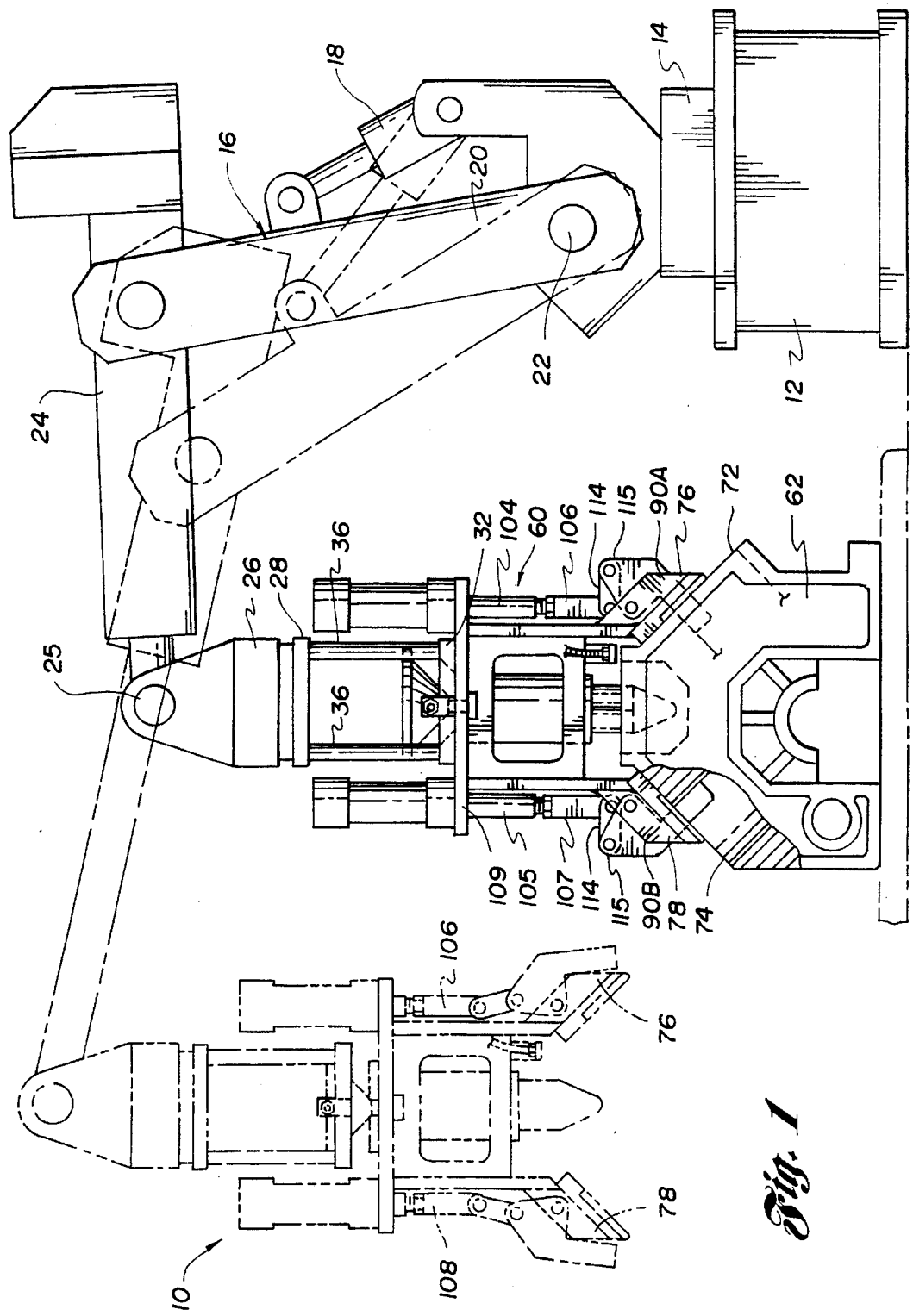
FIG. 1 is an environmental view of the gripper of the present invention shown affixed to the distal end of a robotic arm.

Referring now to FIG. 1, there is shown a robot used in conjunction with an end effector (gripper) of the present invention, generally indicated by reference numeral 10. Robotic gripper 10 moves in cooperation with its base 12, a turnstile 14 for providing rotational movement of the gripper arm assembly 16. Gripper arm assembly 16 comprises a fluid drive cylinder 18 pivotally connected to a gripper arm 20. As can be seen from FIG. 1, the drive cylinder 18 provides for vertical movement of the gripper arm 20 in a plane defined by the connection of the arm 20 to the base 12 at pivot connection 22.

Figure 3:
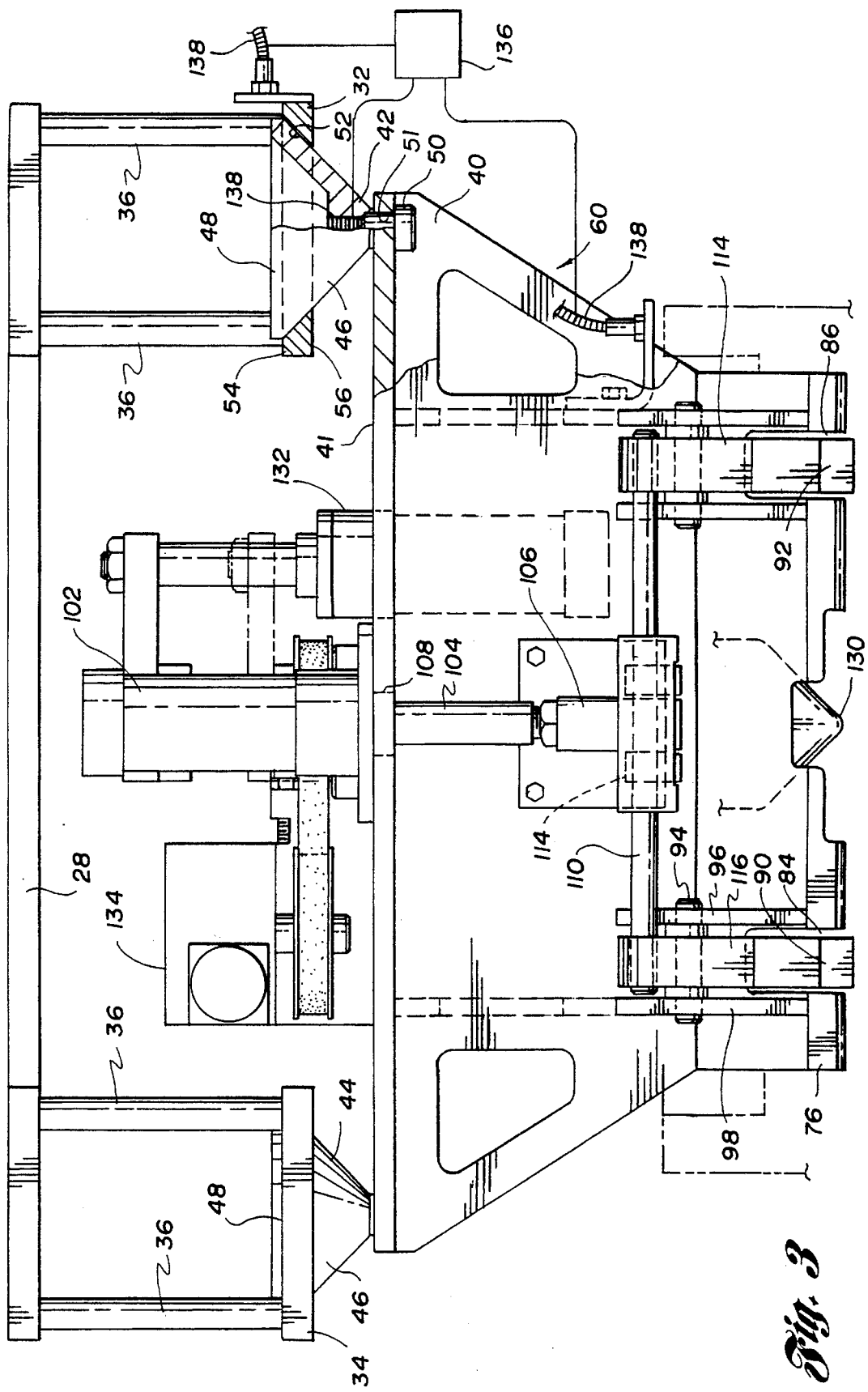
FIG. 3 is partially cross-sectioned side view of the gripper of the present invention.
Figure 4:
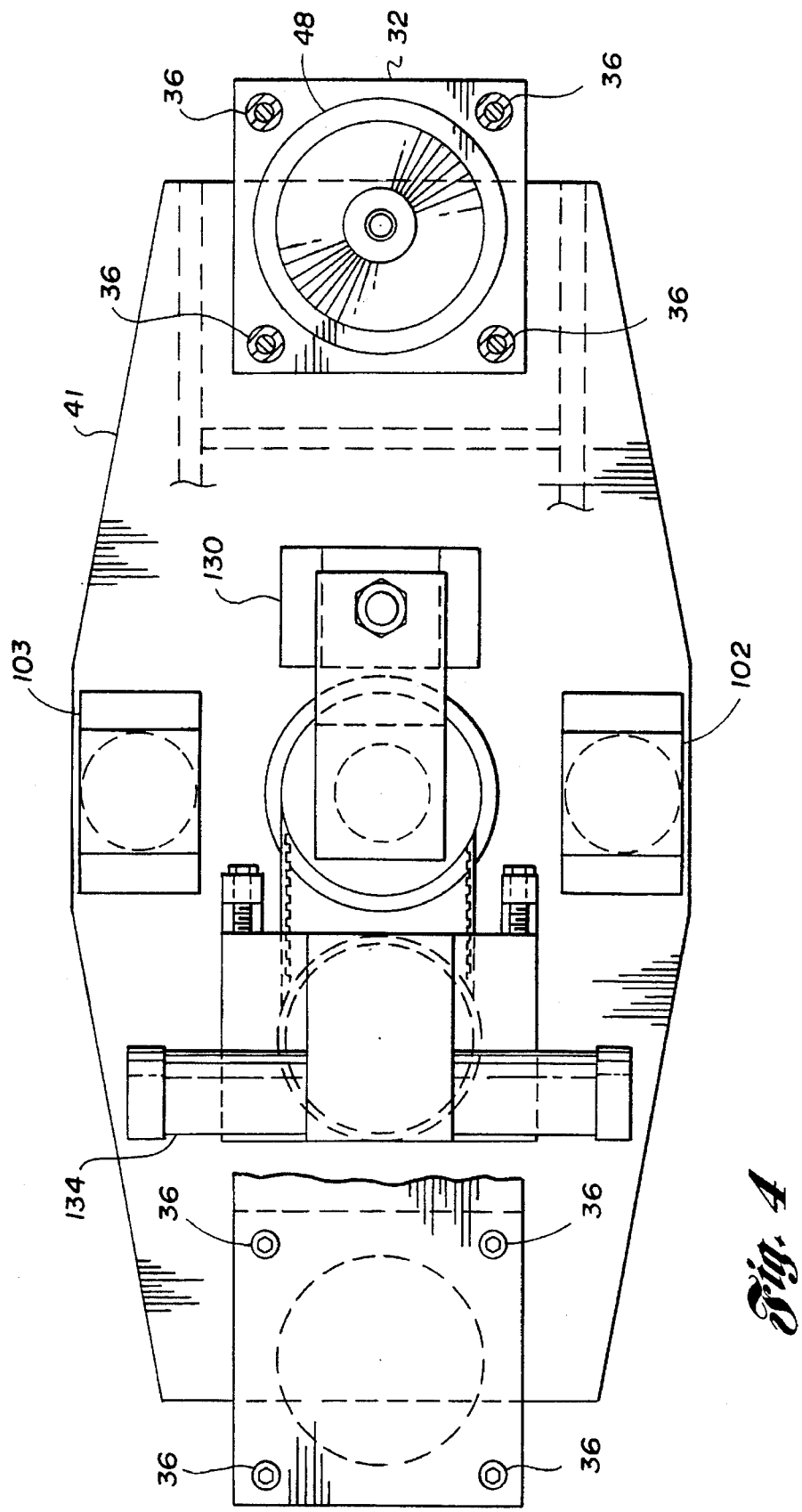
FIG. 4 is a top view of the gripper of the present invention.

A strut arm 24 is pivotally connected to the gripper arm 20. Strut arm 24 is extendable in a horizontal direction out form base 12, as shown in FIG. 1. A fixture 26 is further pivotally connected to the strut arm 24 at pivot connection 25. The fixture 26 is affixed to a top fixture portion 28 and a bottom fixture portion 32, 34. The bottom fixture portion 28 includes two separated, spaced-apart sections 32 and 34 (FIG. 3). In FIG. 4, there are eight spaced-apart columns 36 which affix the top fixture portion 28 to the respective bottom fixture portions 32 and 34.

As shown in FIG. 3, a gripper base 40 having a top surface 41. The top surface has attached thereon a pair of cone-shaped compliant connectors 42 and 44. Each cone connector 42 and 44 includes a frustoconical lower portion 46 and an upper lip portion 48. A conventional fastener 50 connects the compliant connectors 46 and 48 to the gripper base 40. The fastener is adapted to connect to the compliant devices through bores 52 defined in the top surface 41 of the base 40.

Each bottom fixture portion 32 and 34 includes a receiving bore 52 having an inverted frustoconical shape configured to receive a portion of the respective compliant device 46. The bottom fixture portion has an upper surface 54 and a lower surface 56 with the receiving bore 52 defined therebetween. The upper lip portion 48 of the compliant devices 44 and 46 has a diameter greater than the diameter of the receiving bore 52 at the upper surface 54 of the bottom fixture portion. In this manner, the compliant devices and in turn the gripper base 40 are releasably connected to the gripper fixture 26. More specifically, movement of the gripper base 40 in a strictly vertical direction, as shown in the illustration of FIG. 1, shows the compliant devices 46 entirely removed from the receiving bore 52 of the bottom fixture portion 32. In this position, the gripper base 40 is supported on a ground surface and not by the robotic arm assembly 26. This connection of the compliant device to the gripper fixture will be discussed in more detail later on in this application.

Figure 2:
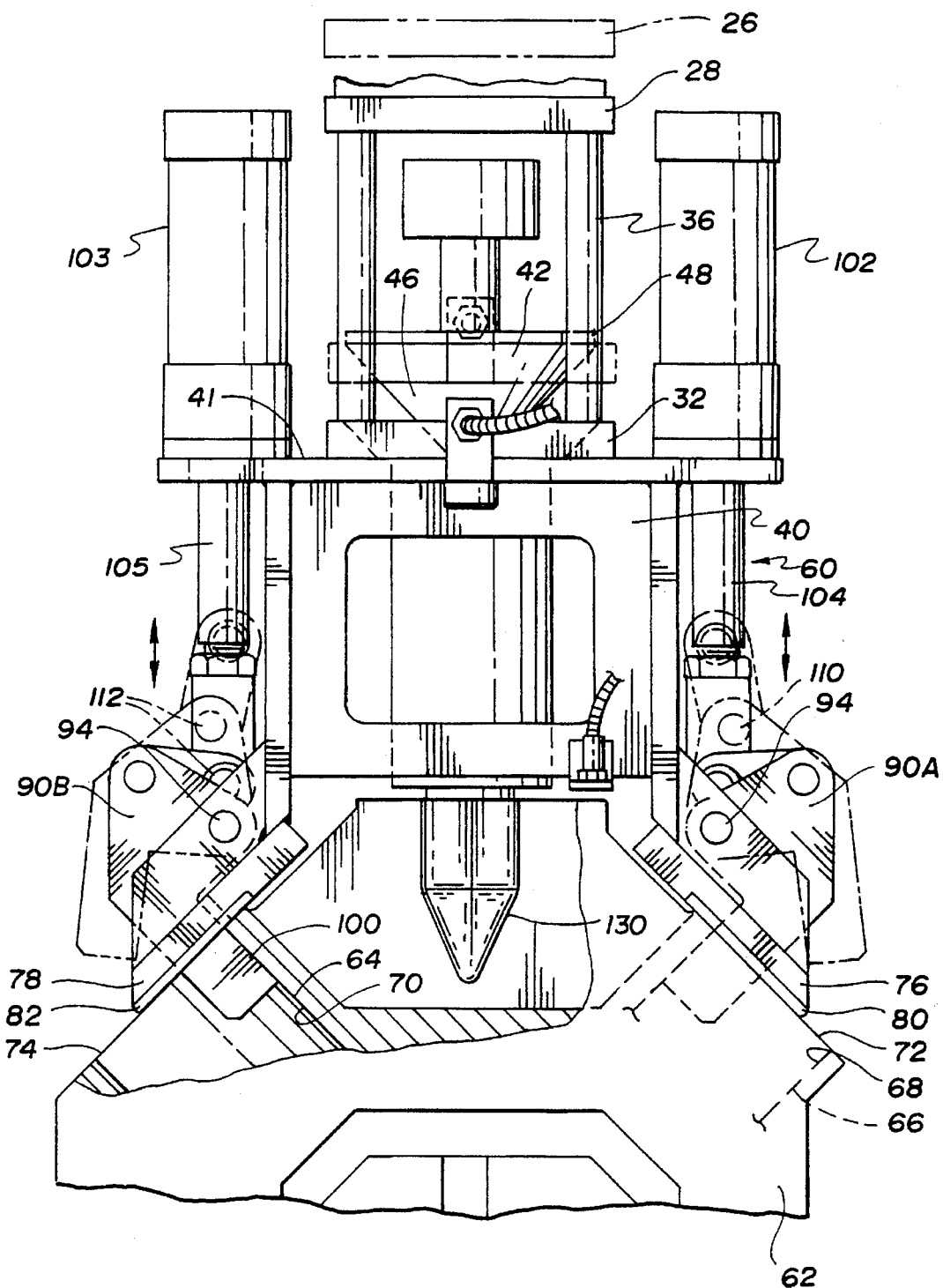
FIG. 2 is a partially cross-sectioned end view of the gripper of the present invention.

Attention is now turned to the gripper assembly 60 of the present invention. As discussed above, the gripper assembly 60 employs an "ice-tong" like principle, and is configured to grip, move and release a workpiece to effectuate a transfer of the workpiece from one location to another location, i.e., from a casting location to a manufacturing location. It is preferred that this transfer be made quickly without and damage to the workpiece. As shown in FIGS. 1 and 2, the workpiece is a conventional V-configured internal combustion engine block designated by reference numeral 62. It is contemplated that the gripper of the present invention mat be adapted to grip any V-configured engine block having at least two extending cylinder bores.

The engine block 62 shown in FIG. 1 and 2 is a conventional V-8 engine block, with only two cylinder bores 64 and 66 shown. Each cylinder bore 64 and 66 includes an inner cylindrical surface 68 and 70 in which a piston (not shown) travels to drive the crankshaft (not shown). The engine block 62 also includes a pair of opposing spaced-apart cylinder head surfaces 72 and 74, where the cylinder heads (not shown) will later be affixed to the engine block in a later assembly process.

The gripper assembly 60 has a pair of spaced apart stabilizers 76 and 78, extending from the gripper base 40. The stabilizers 76 and 78 are designed to engage the cylinder head surfaces and are thus dimensioned and extend from the base 40 in an angled relation matching the shape of the cylinder head surfaces. Each stabilizer (FIG. 2) includes a protective surface 80 and 82 manufactured from steel. This material has a wear resistance for extended service life. Conventional engine blocks are made from cast iron, iron alloys, aluminum alloys and other metals as known in the art.

Each stabilizer has a pair of channels 84 and 86 defined therein. The gripper assembly 60 of the present invention preferably includes two pair of pivotal opposing clamping arms 90 and 92. As shown in FIG. 3, each one of the two pair of opposing clamping arms 90 and 92 pass through the channels 84 and 86 to reach the inner surfaces of the respective cylinder bores. Reference is now turned to the opposing clamping arm pair 90. It is understood that he operation of the second pair of opposing clamping arms 92 is substantially identical to that of clamping arm pair 90.

Each clamping arm 90a and 90b is pivotally connected to stabilizer 76 by a pivot pin connector 94. Pivot pin connector 94 is supported between a pair of shoulders 96 and 98, extending off stabilizer 76. In this manner, clamping arm 90b is pivotal from a first position outside and adjacent a respective cylinder inner wall 70 to a second position abuttingly engaging the inner wall 70. More specifically, the clamping arm 90b outer surface 100 directly engages the inner wall 100. As can be seen from FIG. 2, clamping arm 90a acts in substantially the same manner in pivoting from a first position outside cylinder 66 to a second position abuttingly engaging the inner cylinder wall 68.

Referring to FIG. 3, there is shown a biasing cylinder 102 having a biasing shaft 104 and a connector 106. Biasing cylinder 102 is a conventional pneumatic cylinder that is operable from a retracted position to an extended position as shown in FIG. 1. On the opposite side of gripper 60, there is a corresponding biasing cylinder (FIG. 3) having a biasing shaft 105 and a connector 107 (FIG. 1). Biasing shaft 105 extends through a bore 109 defined in base 40.

With reference to FIG. 3, connector 106 is pivotally affixed to a linkage 114 and then to a control shaft 110. As shown, each control shaft 110 is disposed a perpendicular fashion in relation to the biasing shaft 104. Movement of biasing shaft 104 from the retracted to the extended position moves a control shaft 110 in a vertical fashion. The control shaft 110 is pivotally connected to a link connection 116. The link connection, and a control shaft are pivotally connected to a link connection 116. Link connections 114 and 116 are pivotally connected to clamping arms 90 and 92.

Referring to FIG. 1, there is shown the clamping arms 90a and 90b in the fully engaged second position, clamping onto the engine block 62 and in a fully disengaged first position with the clamping arms open (shown in phantom). As shown in the drawings, movement of the biasing shafts 104 and 105 in a downwardly vertical fashion forces links 114 to pivot and rotate in such a manner as to drive the link ends 115 outwardly. Link ends 115 are pivotally connected to clamping arms 90a and 90b and thereby force the clamping arms to pivot about there respective pivot pin connectors 94 in response to the movement of the biasing shafts. As the clamping arms pivot about their respective pivot pin connectors, the clamping arm outer surfaces are forced into direct contact with the cylinder wall inner surfaces 68 and 70. In the same fashion, clamping arms 92a and 92b (not shown) pivot about the pivot pin connectors and engage the other pair of opposing cylinder walls.

The above-described pivotal connection of the clamping arms 90a and 90b to the link connections, the link connections to the control shafts, control shafts to the connectors can be described as an over center clamping toggle linkage. The advantage of this over center clamping toggle linkage is secure connection of the block 62 to the gripper. In the clamping second position where the engine block 62 is securely connected to the gripper occurs when the connectors 106 and 107 are disposed past top dead center of the pivoting movement of the connectors and the control shafts. Thus, an accidental loss of electrical power or fluid pressure in the pneumatic cylinders will not cause a loss of connection or gripping of the engine block as the over the center toggle linkage will not disengage the clamping arms 90a and 90b. A positive lockup of the block 62 to the gripper 60 is achieved during transportation of the block. Continuing with reference to the drawings, and particularly to FIG. 3, a control means 136 is in communication with first and second biasing means 102 and 103. The control means 136 selectively controls actuation of the first and second biasing means.

Turning again to FIG. 3, there is depicted a dunnage lifting mechanism 130. The mechanism 130 may move axially from a retracted position to an extended position by means of an air cylinder 132. In its extended position, the mechanism 130 may engage a receiving aperture defined within the dunnage. Upon entering the receiving aperture (not shown), the mechanism 130 may rotate by an angle, such as 90°, under the influence of a rotary actuator 134, as depicted in FIGS. 3–4. The mechanism 130 is provided at its distal end with a configuration having a minor and a major axis of different lengths. These axes permit the mechanism to engage the dunnage following rotation. Upon retraction of the mechanism 130, the dunnage is then displaced upwardly before transportation to another location.

Upon arrival at the new site to which the dunnage is transported, disengagement occurs by a reverse process.

In light of the previous disclosure, it will be apparent that the disclosed apparatus has dual functionality. It facilitates both the lift and carry of an engine block, and the lift and carry functions of the block dunnage. The disclosed invention uses an "ice-tong" principle to clamp and lift the blocks. Thus, the prior art step is avoided of unloading the dunnage by manually grasping it by an operator and in placing the dunnage in a designated area. The disclosed invention allows the automatic loading or unloading of engine blocks unto or from a manufacturing line and onto their respective dunnage.

The best mode for carrying out the invention has been described in detail, those familiar with the art to which this invention relates will recognize various alternative designs and embodiments for practicing the invention as defined by the following claims.

I claim:

1. A gripper adapted to be mounted to a distal end of a robotic arm for gripping a workpiece having a pair of spaced apart longitudinally extending contoured faces and at least one pair of cylindrical bores, each cylindrical bore having an inner surface, the gripper comprising:

a gripper base;

a pair of spaced apart longitudinally extending stabilizing members, each affixed to said base, each of said stabilizing members having an engagement surface adapted to abuttingly engage a respective contoured face of said workpiece;

at least one pair of opposing clamping arms pivotally connected to said stabilizing members, each said clamping arm being pivotable from a first position wherein said clamping arm is disposed adjacent a respective cylindrical bore to a second position wherein said clamping arm abuttingly engages the inner surface of a respective one of said cylindrical bores;

a first biasing means being connected to one of said pair of clamping arms for moving said one clamping arm from said first position to said second position;

a second biasing means being connected to the other of said pair of clamping arms for moving said other clamping arm from said first position to said second position;

at least one over the center toggle link connected between each of said biasing means and its respective clamping arm; and a control means in communication with the biasing means for selectively controlling actuation of said first and second biasing means, so that once the clamping arms are in the second position, each biasing means must be retracted to release the clamping arms, whereby clamping force is maintained by the over the center toggle link during power outages or in the event of a disconnected biasing means.

2. The gripper of claim 1 wherein the contoured faces of said workpiece are disposed in a predetermined angled relation with respect to each other and said stabilizing members are further disposed in a corresponding angled relation with respect to each other.

3. The gripper of claim 1 further comprising a pair of spaced apart compliant devices which are affixed to the base for releasably connecting said base to said distal end of said robotic arm.

4. The gripper of claim 3 further comprising a gripper fixture pivotally connectable to said distal end of said robotic arm, said gripper fixture having a top plate member and a bottom plate member.

5. The gripper of claim 4 wherein each said compliant device comprises a cone shaped member affixed to said base and a cooperating receiving bore disposed within said bottom plate member of said gripper fixture, said receiving bore having an upper surface and a lower surface, said cone shaped member having a frustoconical portion and an upper lip portion, said upper lip portion extending at least partially circumferentially around one end of said frustoconical portion and having a diameter larger than the diameter of said receiving bore such that said frustoconical portion is receivable within said receiving bore and said upper lip portion is supportable on said upper surface of said receiving bore.

6. The robotic gripper of claim 1 further comprising a second pair of opposing clamping arms, each of said second pair of clamping arms being pivotal from a first position wherein said clamping arm is disposed adjacent a respective cylindrical bore to a second position wherein said clamping arm abuttingly engages the inner surface of a respective one of said cylindrical bores.

7. The gripper of claim 1 wherein one of said first pair of opposing clamping arms is pivotally connected to one of said pair of stabilizing members at one end and pivotally connected to a first link member at the other end and said first link member is pivotally connected to said first biasing means, the other of said first pair of opposing clamping arms is pivotally connected to the other of said pair of stabilizing members at one end and pivotally connected to a second link member at the other end and said second link member is pivotally connected to said second biasing means thereby transforming the vertical movement of said first and second biasing means to rotational movement of said first pair of clamping arms, said first and second links comprising said over the center toggle links.

8. A robotic gripper system for gripping a workpiece having a pair of spaced apart longitudinally extending contoured faces and at least two extending cylindrical bores, each cylindrical bore having an inner surface, and the contoured faces disposed at an angle in relation to the each other, the robotic gripper system comprising:

an industrial robot having a movable robotic arm;

a gripper base pivotally mounted on a distal end of said robotic arm;

a pair of spaced apart longitudinally extending stabilizing members, each affixed to said base, each of said stabilizing members having an engagement surface adapted to abuttingly engage a respective contoured face of said workpiece;

at least one pair of opposing clamping arms pivotally connected to said stabilizing members, each said clamping arms being pivotable from a first position wherein said clamping arm is disposed adjacent a respective cylindrical bore to a second position wherein said clamping arm abuttingly engages the inner surface of a respective one of said cylindrical bores;

a first biasing means connected to one of said pair of clamping arms by a first over the center type toggle link for moving said one clamping arm from said first position to said second position;

a second biasing means being connected to the other of said pair of clamping arms by a second over the center type toggle link for moving said other clamping arm from said first position to said second position; and a control means in communication with the biasing means for selectively controlling actuation of said first and second biasing means, so that once the clamping arms are in the second position, each biasing means must be retracted to release the clamping arms, whereby clamping force is maintained by the over center clamping toggle link during power outages or in the event of a disconnected biasing means.

9. The gripper of claim 8 further comprising a pair of spaced apart complaint devices affixed to the base for releasably connecting said base to said distal end of said robotic arm.

10. The gripper of claim 9 further comprising a gripper fixture pivotally connected to said distal end of said robotic arm, said gripper fixture having a top plate member and a bottom plate member.

11. The gripper of claim 10 wherein each said compliant device comprises a cone shaped member affixed to said base and a cooperating receiving bore disposed within said bottom plate member of said gripper fixture, said receiving bore having an upper surface and a lower surface, said cone shaped member having a frustoconical portion and an upper lip portion, said upper lip portion extending at least partially circumferentially around one end of said frustoconical portion and having a diameter larger than the diameter of said receiving bore such that said frustoconical portion is receivable within said receiving bore and said upper lip portion is supportable on said upper surface of said receiving bore.

12. The robotic gripper of claim 8 further comprising a second pair of opposing clamping arms, each of said second pair of clamping arms being pivotal from a first position wherein said clamping arm is disposed adjacent a respective cylindrical bore to a second position wherein said clamping arm abuttingly engages the inner surface of a respective one of said cylindrical bores.

13. The gripper of claim 8 wherein each of said first pair of opposing clamping arms are pivotally connected to a respective one of said pair of stabilizing members.

14. The gripper of claim 12 wherein one of said first pair of opposing clamping arms is pivotally connected to one of said pair of stabilizing members at one end and pivotally connected to a first link member at the other end and said first link member is pivotally connected to said first biasing means, the other of said first pair of opposing clamping arms is pivotally connected to the other of said pair of stabilizing members at one end and pivotally connected to a second link member at the other end and said second link member is pivotally connected to said second biasing means thereby transforming the vertical movement of said first and second biasing means to rotational movement of said first pair of clamping arms, said first and second links comprising said first and second over the center toggle links respectively.

15. A robotic gripper system for gripping a V-configured engine block having a pair of angularly spaced apart longitudinally extending contoured faces and at least two extending cylinder bores, each cylinder bore having an inner surface, the robotic gripper comprising:

an industrial robot having an extending movable robotic arm;

a gripper base, said gripper base including a gripper fixture pivotally mounted on a distal end of said robotic arm, said gripper fixture having a top plate member and a bottom plate member;

a pair of spaced apart longitudinally extending stabilizing members, each affixed to said base, each of said stabilizing members having an engagement surface angularly related to each other such that the stabilizing members are adapted to abutting engage a respective contoured face of said engine block;

at least one pair of opposing clamping arms pivotally connected to said stabilizing members, each said clamping arm being pivotable from a first position wherein said clamping arm is disposed adjacent a respective cylindrical bore to a second position wherein said clamping arm abuttingly engages the inner surface of a respective one of said cylindrical bores;

a first biasing cylinder being connected to one of said pair of clamping arms for moving said one clamping arm from said first position to said second position;

a second biasing cylinder being connected to the other of said pair of clamping arms for moving said other clamping arm from said first position to said second position;

at least one over the center toggle link connected between each of said biasing cylinders and its respective clamping arm; and a control means in communication with the biasing means for selectively controlling the actuation of said first and second biasing cylinders, so that once the clamping arms are in the second position, each biasing means must be retracted to release the clamping arms, whereby clamping force is maintained by the over the center toggle link during power outages or in the event of a disconnected biasing means.

16. The robotic gripper of claim 15 further comprising a second pair of opposing clamping arms, each of said second pair of clamping arms being pivotal from a first position wherein said clamping arm is disposed adjacent a respective cylindrical bore to a second position wherein said clamping arm abuttingly engages the inner surface of a respective one of said cylindrical bores.

17. The gripper of claim 16 wherein each of said first and second pair of opposing clamping arms are pivotally connected to a respective one of said pair of stabilizing members.

18. The gripper of claim 17 wherein one of said first pair of opposing clamping arms is pivotally connected to one of said pair of stabilizing members at one end and pivotally connected to a first link member at the other end and said first link member is pivotally connected to said first biasing cylinder, the other of said first pair of opposing clamping arms is pivotally connected to the other of said pair of stabilizing members at one end and pivotally connected to a second link member at the other end and said second link member is pivotally connected to said second biasing cylinder thereby transforming the vertical movement of said first and second biasing means to rotational movement of said first pair of clamping arms, said first and second links comprising said over the center toggle links.

19. A robotic gripper system for gripping a workpiece having a pair of spaced apart longitudinally extending contoured faces and at least two extending cylindrical bores, each cylindrical bore having an inner surface, and the contoured faces disposed at an angle in relation to the each other, the robotic gripper system comprising:

an industrial robot having a movable robotic arm;

a gripper base pivotally mounted on a distal end of said robotic arm;

a pair of spaced apart longitudinally extending stabilizing members, each affixed to said base, each of said stabilizing members having an engagement surface adapted to abuttingly engage a respective contoured face of said workpiece;

a first pair of opposing clamping arms pivotally connected to said stabilizing members, each of said first pair of clamping arms being pivotal from a first position wherein said clamping arm is disposed adjacent a respective cylindrical bore to a second position wherein said clamping arm abuttingly engages the inner surface or a respective one of said cylindrical bores;

a first biasing means being connected to one of said pair of clamping arms by an over the center type toggle link for moving said one clamping arm from said first position to said second position;

a second biasing means being connected to the other of said pair of clamping arms by a second over the center type toggle link for moving said other clamping arm from said first position to said second position;

a control means in communication with the biasing means for selectively controlling actuation of said first and second biasing means, so that once the clamping arms are in the second position, each biasing means must be retracted to release the clamping arms, whereby clamping force is maintained by the over the center toggle link during power outages or in the event of a disconnected biasing means;

a second pair of opposing clamping arms, each of said second pair of clamping arms being pivotal from a first position wherein said clamping arm is disposed adjacent a respective cylindrical bore to a second position wherein said clamping arm abuttingly engages the inner surface of a respective one of said cylindrical bores; and wherein each of said first of opposing clamping arms is pivotally connected to a respective one of said pair of stabilizing members.

* * * * *